United States Patent [19]

Schreiner

[11] 4,363,496
[45] Dec. 14, 1982

[54] MATERIAL HANDLING CART

[75] Inventor: Charles P. Schreiner, Saugatuck, Mich.

[73] Assignee: Westinghouse Electric Corp., Pittsburgh, Pa.

[21] Appl. No.: 212,954

[22] Filed: Dec. 4, 1980

[51] Int. Cl.³ ............................................. B62B 3/10
[52] U.S. Cl. ................................. 280/47.35; 108/152; 211/126; 248/129
[58] Field of Search ............ 280/47.34, 47.35, 79.1 R, 280/79.1 A, 79.2, 79.3, 33.99 R; 248/129, 214, 215; 108/152; 211/126, 88; 186/45

[56] References Cited

U.S. PATENT DOCUMENTS

| D. 163,604 | 6/1951 | Hoey | 280/47.34 X |
| 3,829,113 | 8/1974 | Epelbaum | 280/47.34 X |
| 3,834,724 | 9/1974 | Trubiano | 280/79.3 X |

FOREIGN PATENT DOCUMENTS

| 676951 | 12/1963 | Canada | 211/126 |
| 83934 | 9/1964 | France | 280/47.34 |

Primary Examiner—Duane A. Reger
Assistant Examiner—Donald W. Underwood
Attorney, Agent, or Firm—B. R. Studebaker

[57] ABSTRACT

A material handling cart for storing and transporting one or more material handling totes of various sizes. The cart includes a plurality of vertically spaced horizontal support rails interconnecting a pair of frames having casters at the base thereof and curved handle portions rearward of the horizontal support rails.

5 Claims, 6 Drawing Figures

MATERIAL HANDLING CART

BACKGROUND OF THE INVENTION

This invention relates to material handling carts and more particularly to a strong light-weight material handling cart for storing and transporting cantilevered material handling totes.

In modern manufacturing processes, particularly those employed in the electronics industry, there is a need for a facility to handle large numbers of comparatively small electronic parts such as printed circuit boards and the like. During these manufacturing processes, there is a need to store parts and subassemblies at various stages of the processing. For example, parts and subassemblies need to be stored in large storage areas in large numbers and to have the ability to be moved in large quantities by industrial fork trucks and the like. These parts in smaller numbers also may need to be removed from storage areas to work areas and from one work area to another by hand carts and the like and be stored at work areas under work surfaces or on vertical wall surfaces for access by manufacturing personnel.

A system has been developed which employs a uniquely designed material handling tote of the type disclosed in U.S. Patent Application Ser. No. 212,946, filed the same date as this application for Material Handling Tote, by Charles P. Schreiner et al. This material handling tote may be employed in a total material handling system and may be, for example, stored in large numbers on the pallet frame disclosed in U.S. Patent Application Ser. No. 212,953, filed the same date as this application, by Charles P. Schreiner for a Pallet Frame, or moved from place to place, from a major storage area to a work area or from one work area to another work area on a versatile material handling cart of the type disclosed in this application. Additionally, as a part of the overall system, the material handling tote may be supported by a wall hung support rail of the type disclosed in copending application Ser. No. 212,944, filed by Charles P. Schreiner the same date as this application for a Wall-Hung Support Rail or stored beneath a work surface on pairs of tote guides of the type disclosed in copending application Ser. No. 212,945, filed the same date as this application by Charles P. Schreiner for a Tote Guide. Each of the foregoing applications are owned by the same assignee as this application.

SUMMARY OF THE INVENTION

The material handling cart of this invention is an integral part of the above-described system and provides for the transportation and storage of material handling totes in manageable quantities. The material handling cart of this invention includes a pair of spaced, parallel, vertical members interconnected by a plurality of equidistantly spaced horizontal support rails. A forwardly and downwardly projecting support leg is connected to each of the vertical members and terminates in a vertical portion remote from the connection to the vertical members. A first pair of fixed casters are mounted in the bottom of each of the vertical members and a second pair of rotatable casters are mounted in the ends of each of the vertical portions of the support legs. The spaced parallel vertical members include curved handle portions and hand grips at the ends of the vertical members remote from the casters. The horizontal support rails are tubular and include a flat back portion and a front portion that is parallel with the back portion for its lower half and tapered toward the back portion for its upper half to thereby accommodate material handling totes of the type disclosed in the aforesaid copending application Ser. No. 212,946 in a cantilevered position. Triangular brace means interconnect each of the vertical members with its associated downwardly projecting support leg.

BRIEF DESCRIPTION OF THE DRAWINGS

Many of the attendant advantages of the present invention will become more readily apparent and better understood as the following detailed description is considered in connection with the accompanying drawings, in which.

DESCRIPTION OF THE PREFERRED EMBODIMENTS

Figure 1:
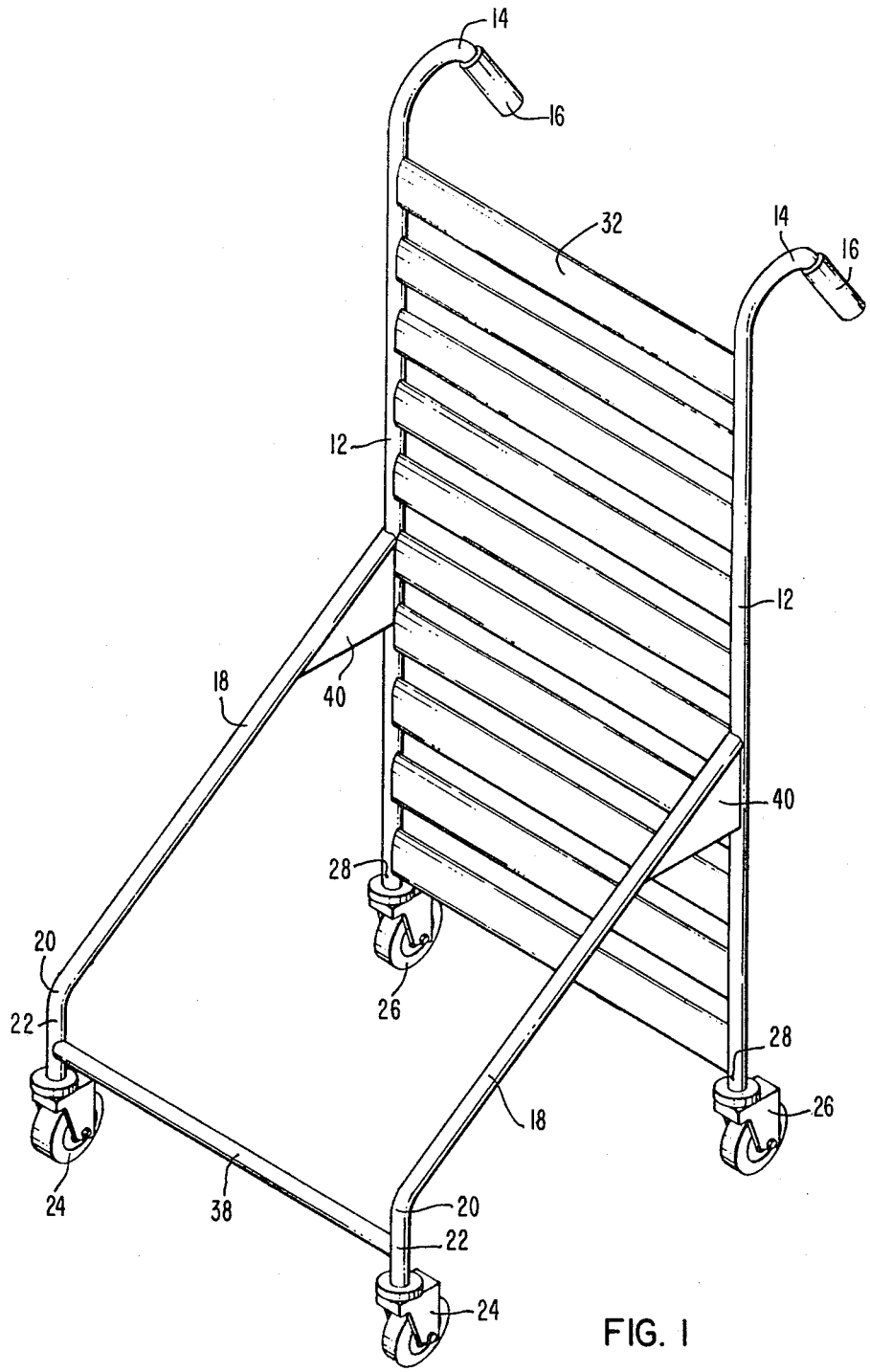
FIG. 1 is a prospective view of the material handling cart of this invention.
Figure 2:
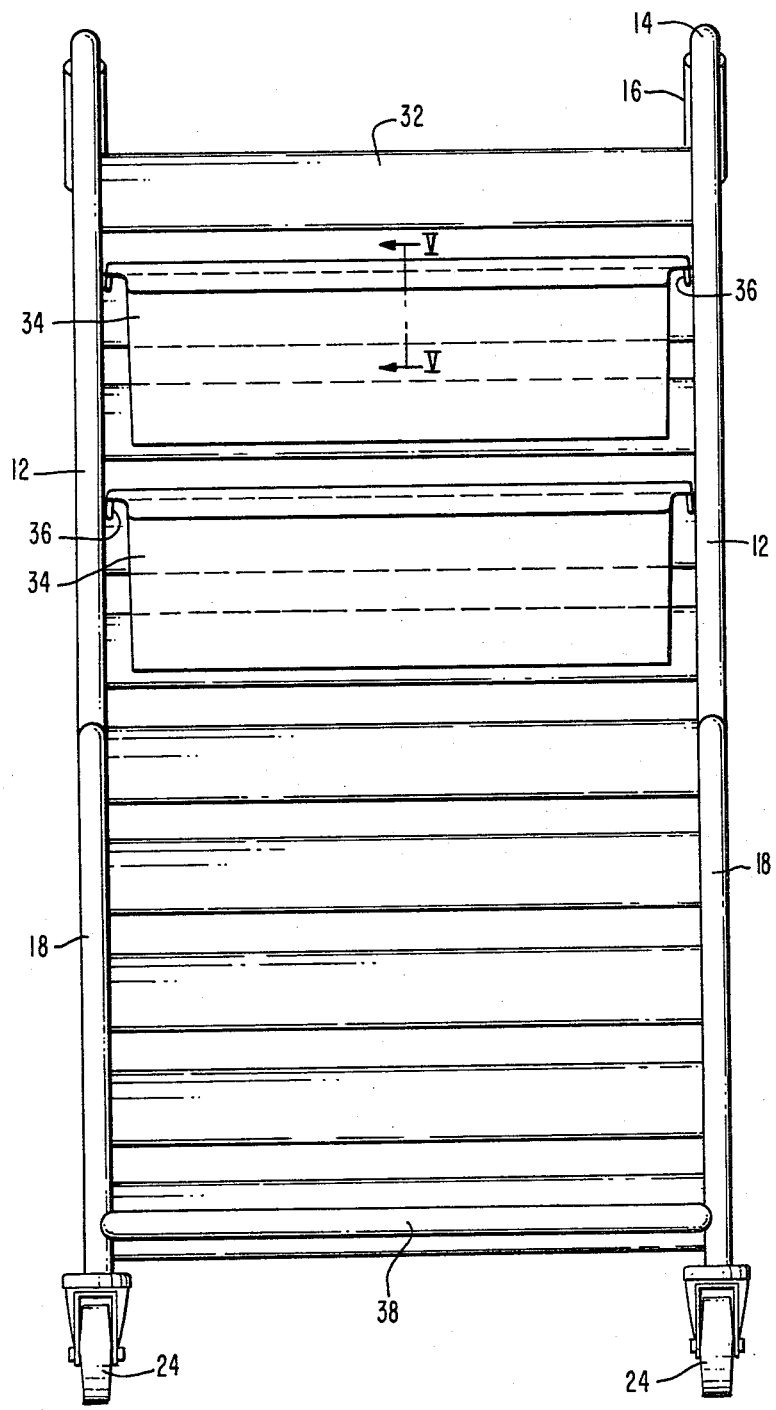
FIG. 2 is a front elevation view thereof including material handling totes.

Referring now in detail to the drawing wherein like reference characters represent like parts throughout the several views, there is illustrated in FIG. 1 the material handling cart of this invention. The material handling cart includes a pair of spaced parallel vertical or upright members 12 having rearwardly curved upper portions 14 which include handle grips 16 on the ends thereof. The spaced vertical members 12 have projecting downwardly and forwardly from about their mid point forward support legs 18 which curve downwardly at their forward ends into a vertical short leg portion 22 which extends parallel with the vertical members 12. Each of the vertical members 12 and the vertically extending portions 22 of the support legs 18 are tubular and have open ends for receiving casters. The short portions 22 at the front of the material handling cart receive rotatable casters 24 while the bottoms of the upright members 12 are provided with fixed casters 26 which are prevented from rotating in the bottom end of the members 12 by pins 28 which extend through both the lower portion of the support member 12 and the caster stud 30.

The spaced vertical or upright members 12 are interconnected by a plurality of vertically spaced, parallel horizontal support rails 32 which are adapted to carry thereon a material handling tote 34 of the type disclosed in copending application Ser. No. 212,946, filed the same day as this application, by Charles P. Schreiner et al. for Material Handling Tote. The totes 34 are provided with a uniquely designed flange 36 which will permit them to be cantileverly mounted to the support rails 32 along any of the four edges of the tote 34. The forward support legs 18 are interconnected by a lateral rigidizing member 38 which interconnects the forward support legs 18 in their vertically oriented portions 22. In order to provide a strong and yet lightweight material handling cart, triangular support braces 40 are provided at the intersection of the vertical members 12 and the forwardly and downwardly projecting forward support legs 18.

Figure 3:
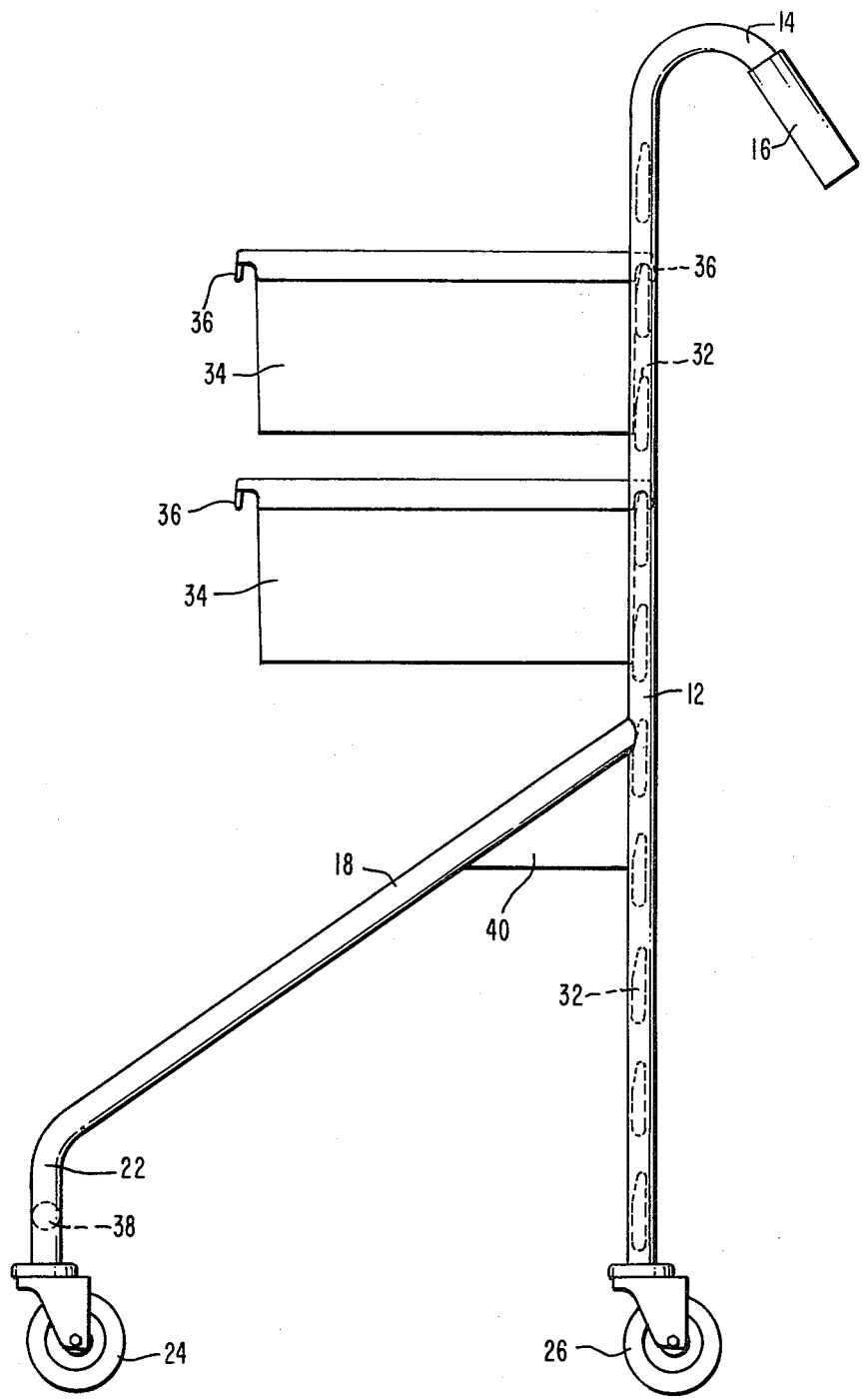
FIG. 3 is a side elevation view thereof having cantilevered material handling totes thereon.
Figure 4:
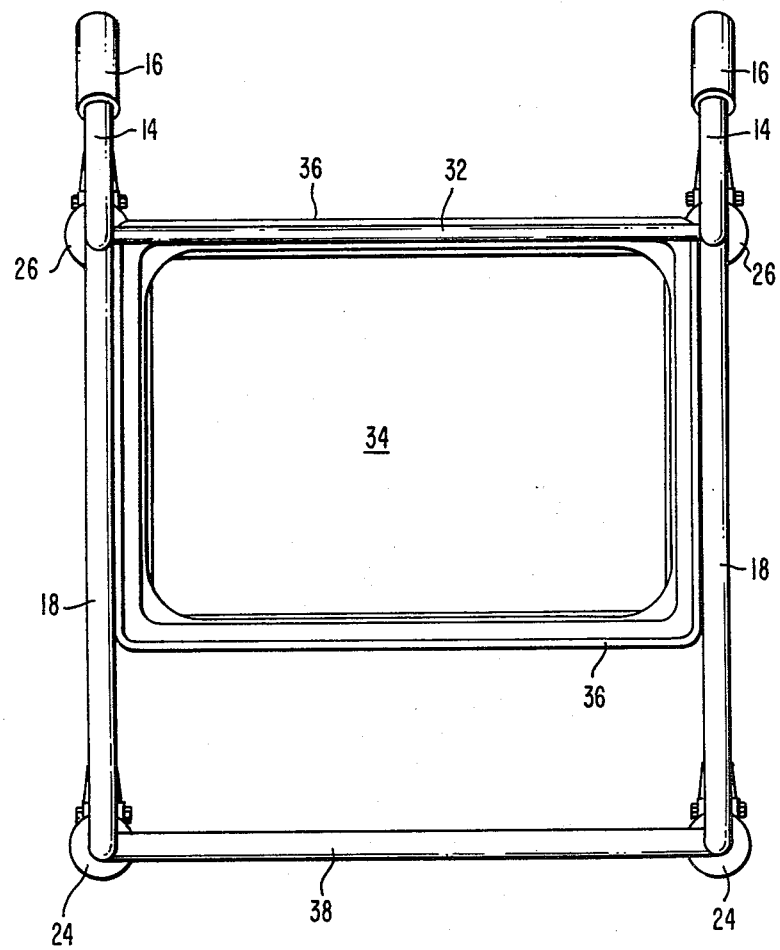
FIG. 4 is a top plan view thereof also including a material handling tote.
Figure 6:
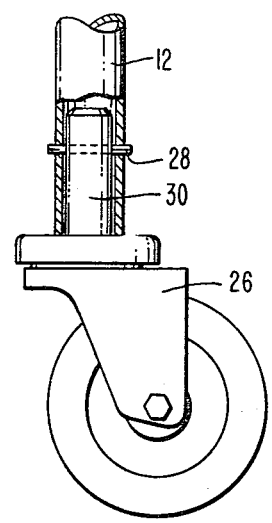
FIG. 6 is a side elevation view of a rear caster with a portion of the support post broken away.
Figure 5:
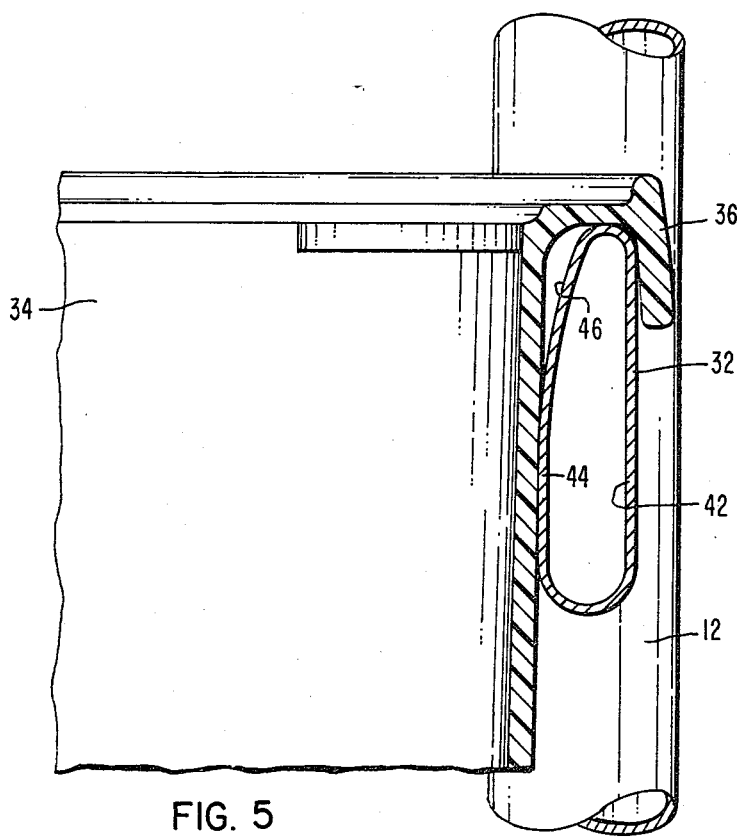
FIG. 5 is a sectional view taken along the line V—V of FIG. 2.

The horizontal support rails 32 are tubular and include a flat back portion 42 and a front portion that is parallel with the back portion for its lower half 44 and tapered toward the back portion for its upper half 46 in order to accommodate and carry in a cantilevered fashion a material handling tote of the type disclosed at 34. As will be apparent from FIG. 3, when larger material handling totes have their flange 36 hooked over one of the equidistantly spaced support rails 32 so that the flange 36 is hooked to the flat back portion 42 of a support rail, the lower half 44 of the front portion of that support rail along with the lower half 44 of the front portion of the next lower support rail will act to laterally support the material handling tote 34.

The upright or vertical members 12 and the forward support legs 18 are preferably 14 gauge steel tubing and provide in side elevation a pair of substantially h-shaped side members wherein the horizontal portion is sloped down and away from the longer vertical portion and terminates in a short vertical leg to provide four corners of vertically oriented hollow tubes to receive conventional casters 24 and 26.

As will be apparent from the foregoing, the material handling cart of this invention is a lightweight but structurally rigid push-type cart which is adapted to carry a plurality of material handling totes in a cantilevered fashion from the plurality of horizontal support rails which form a vertical open back to the cart and is particularly adapted for providing storage as well as transportation for material handling totes employed in an integrated material handling system for electronic parts and the like.

What is claimed is:

1. A material handling cart for storing and supporting a plurality of material handling totes of different depths, said cart comprising:

a pair of spaced parallel vertical members;

a plurality of equidistantly spaced horizontal support rails interconnecting said pair of spaced parallel vertical members constructed and arranged to support material handling totes of different depths, said horizontal support rails being tubular and including a flat back portion and a front portion that is parallel with said back portion for its lower half and tapered towards said back portion for its upper half;

a forwardly and downwardly projecting support leg connected to each of said vertical members, said forwardly and downwardly projecting support legs terminating in a vertical portion remote from their connection to said vertical member; and a first pair of casters, one each mounted in the bottom of each of said vertical members and a second pair of casters one each mounted in the end of each of said vertical portions of said support legs.

2. The material handling cart according to claim 1 wherein said first pair of casters are fixed in a plane perpendicular to said horizontal support rails and said second pair of casters are rotatable in said vertical portions of said support legs.

3. The material handling cart of claim 1 wherein said pair of spaced parallel vertical members include curved handle portions and hand grips at the upper ends thereof remote from said casters.

4. The material handling cart according to claim 1 wherein triangular brace means interconnect said spaced parallel vertical members and said forwardly and downwardly projecting support legs adjacent their intersection.

5. A material handling cart according to claim 1 wherein said equidistantly spaced horizontal support rails are spaced a predetermined distance from each other and a material handling tote hooked to the flat back portion of one support rail will be laterally supported by the lower half of the next lower support rail.

* * * * *